United States Patent Office  3,849,490
Patented Nov. 19, 1974

3,849,490
CYCLOHEXADIENYLAMIDOALKYLPHENYL-
SULFONYL UREAS
Berthold Richard Vogt, North Brunswick, Jack Bernstein, New Brunswick, and Frank Lee Weisenborn, Somerset, N.J., assignors to E. R. Squibb & Sons, Inc., New York, N.Y.
No Drawing. Filed May 18, 1971, Ser. No. 144,678
Int. Cl. C07c 127/00
U.S. Cl. 260—553 DA                12 Claims

ABSTRACT OF THE DISCLOSURE
Hypoglycemic compounds of the formula

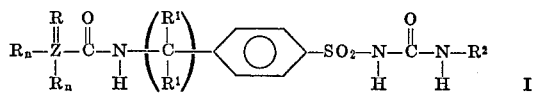

wherein R may be lower alkyl, lower alkoxy, halogen, cycloalkoxy having from 5 to 6 carbon atoms, cycloalkyl of from 5 to 8 carbon atoms, lower alkylmercapto, lower alkylsulfinyl, lower alkylsulfonyl, phenylsulfonyl, phenyl, lower phenylalkyl, lower acyl, benzoyl, trifluoromethyl, lower acyloxy, benzyloxy, carboxy, lower carbalkoxy, nitrile, carbamyl, lower alkyl-carbamyl, lower dialkyl-carbamyl or nitro; $n$ may be 0 or 1; $R^1$ may be H or alkyl of from 1 to 3 carbon atoms; $m$ may be 1, 2 or 3; Z may be a cyclohexadienyl radical which may be mono-, di- or tri-substituted by R; and $R^2$ may be (1) hydrogen, alkyl, alkenyl or mercaptoalkyl of from 2 to 8 carbon atoms;
(2) a radical of the formula $$-(CH_2)_p-E-(CH_2)_q CH_3$$

wherein E may be O, S or

$p$ may be from 2 to 7; and $q$ may be 0 to 5, the sum of $p+q$ being from 3 to 7;
(3) phenylalkyl wherein the alkyl radical has from 1 to 3 carbon atoms or phenylcycloalkyl wherein the cycloalkyl radical has from 3 to 8 carbon atoms;
(4) cycloalkyl or cycloalkenyl of from 5 to 8 carbon atoms or alkyl-substituted cycloalkyl or cycloalkenyl wherein the alkyl radical has from 1 to 3 carbon atoms;
(5) endoalkylene cycloalkyl, endoalkylene cycloalkenyl, bisendoalkylene cycloalkyl or bisendoalkylene cycloalkenyl wherein the endoalkylene part has from 1 to 4 carbon atoms and the cycloalkyl or cycloalkenyl part has from 5 to 8 carbon atoms;
(6) a saturated, mono- or di-unsaturated heterocyclic ring containing from 4 to 6 carbon atoms and an oxygen atom or a sulfur atom or a nitrogen atom.
(7) a saturated, mono- or di-unsaturated heterocyclic ring linked to the nitrogen atom by means of a methylene group and containing from 4 to 5 carbon atoms and either an oxygen or a sulfur atom.

Preferred compounds of the present invention are those wherein the 2-position of the cyclohexadienyl radical contains a straight chain or branched alkoxy substituent of up to 6 carbon atoms. Most preferred compounds are those wherein the 2-position is substituted as above and in addition either the 4-position or the 5-position, or both, may contain a halogen or a straight chain or branched alkyl substituent of up to 6 carbon atoms. The compounds of the invention are also intermediates for the preparation of corresponding aromatic analogs.

OBJECTS OF THE INVENTION
It is an object of the present invention to prepare new compounds which are effective hypoglycemic agents. A further object is to provide a method for the preparation of these compounds. Still another object is to provide a new method for the preparation of 1-$R^2$-substituted-3-[[$p$-(benzene)amidoalkyl]phenyl]sulfonyl ureas. These and other objects of the present invention will be apparent from the following description.

DETAILED DESCRIPTION
The compounds of the present invention may be prepared according to methods generally known for the preparation of compounds of this type. For example, a $p$-(aminoalkyl)phenylsulfonylurea of formula III may be reacted with an acylating agent of the formula

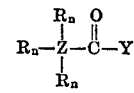

wherein R, $n$, and Z are as previously defined and Y is OH, O-alkali metal or halogen. This general reaction is shown by the following equation wherein $R^1$, $m$ and $R^2$ are as previously defined:

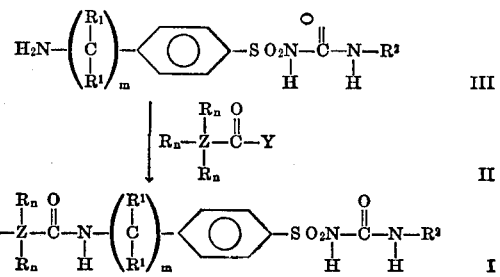

The foregoing reactions may, of course, be carried out in the reverse sequence by first acylating the $p$-(aminoalkyl)phenylsulfonamide and then reacting the product with the $R^2$-substituted isocyanate. It will be obvious to those skilled in the art that the isocyanate group of the $R^2$-substituted isocyanate may be replaced by an isothiocyanate, a carbamic acid ester, a thiocarbamic acid ester, a carbamic acid halide or urea. If an $R^2$-substituted isothiocyanate is used, the resultant thiourea is subsequently hydrolyzed to the urea.

Another method is to react an amine or amine salt of formula $R^2$—$NH_2$ with an acylated $p$-(aminoalkyl)phenylsulfonylisocyanate, carbamic acid ester, thiocarbamic acid ester, carbamic acid halide or urea, wherein the acyl radical is

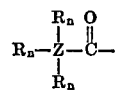

The intermediate $p$-(aminoalkyl)phenylsulfonamides are known compounds which may be readily prepared, for example, by reacting an N-protected acylated phenalkylamine with $HOSO_2Cl$ to the form $p$-(N-acylated aminoalkyl)phenylsulfonyl chloride, and reacting the latter with ammonia to form the corresponding sulfonamide, and removing the protecting acyl group.

The isocyanate of the formula OCN—$R^2$ may be prepared in known manner, for example by reacting an amine of the formula $H_2N$—$R^2$ with phosgene.

The cyclohexadienyl radical Z may be derived from an acid or alkali metal salt thereof or acyl halide thereof having any of the following formulas wherein Y, R and n are as defined previously:

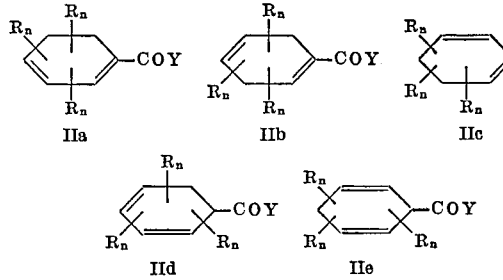

Examples of acyl halides and acids, or lower alkyl esters or salts which may be converted to the acid or halide by known methods which may be used in the process of the present invention are the following:

cyclohexa-1,3-diene-1-carbonyl chloride;
cyclohexa-2,5-diene-1-carbonyl chloride;
cyclohexa-1,4-diene-1-carboxylic acid;
cyclohexa-1,5-diene-1-carboxylic acid;
cyclohexa-2,4-diene-1-carboxylic acid;
cyclohexa-2,5-diene-1-carboxylic acid;
2-methylcyclohexa-1,4-diene-1-carboxylic acid;
4-methylcyclohexa-1,4-diene-1-carboxylic acid;
4-chlorocyclohexa-1,4-diene-1-carboxylic acid;
4-phenylcyclohexa-1,4-diene-1-carboxylic acid;
6-phenylcyclohexa-1,4-diene-1-carboxylic acid;
3-chloro-5,5-dimethylcyclohexa-1,3-diene-1-carboxylic acid;
2-methylcyclohexa-2,5-diene-1-carboxylic acid;
3-methylcyclohexa-2,5-diene-1-carboxylic acid;
cyclohexa-1,3-diene-1-carboxylic acid ethyl ester;
2-methylcyclohexa-1,3-diene-1-carboxylic acid methyl ester;
4-methylcyclohexa-1,3-diene-1-carboxylic acid ethyl ester;
4-chlorocyclohexa-1,3-diene-1-carboxylic acid methyl ester;
6-chlorocyclohexa-1,4-diene-1-carboxylic acid methyl ester;
3-chlorocyclohexa-1,5-diene-1-carboxylic acid methyl ester;
4-ethylcyclohexa-1,5-diene-1-carboxylic acid methyl ester;
1-chlorocyclohexa-2,4-diene-1-carboxylic acid methyl ester;
6-chlorocyclohexa-2,4-diene-1-carboxylic acid methyl ester.

Preferred acylating agents are those wherein the 2-position of the cyclohexadienyl radical contains a straight or branched alkoxy substituent of up to 6 carbon atoms. Most preferred acylating agents are those wherein the 2-position is substituted as above and in addition either the 4-position or the 5-position, or both, may contain a halogen or a straight or branched alkyl substituent of up to 6 carbon atoms. Examples of the acid form of these acylating agents are the following:

2-methoxy-2,5-cyclohexadien-1-yl carboxylic acid;
4-methyl-2-methoxy-2,5-cyclohexadien-1-yl carboxylic acid;
5-methyl-2-methoxy-2,5-cyclohexadien-1-yl carboxylic acid;
4-chloro-2-methoxy-1,4-cyclohexadien-1-yl carboxylic acid;
5-chloro-2-methoxy-1,4-cyclohexadien-1-yl carboxylic acid;
4-bromo-2-methoxy-2,5-cyclohexadien-1-yl carboxylic acid;
5-bromo-2-methoxy-2,5-cyclohexadien-1-yl carboxylic acid;
2,5-dimethyl-2,5-cyclohexadien-1-yl carboxylic acid.

Examples of various compounds which may be used to form the $R^2$ radical of the compounds of the invention are the following:

methylamine, ethylamine, n-propylamine, 2-propylamine (isopropylamine), n-butylamine, sec-butylamine, isobutylamine, 2-methyl-2-propylamine (t-butylamine), n-amylamine, isoamylamine, n-hexylamine, n-heptylamine, n-octylamine, allylamine, n-butene-3-ylamine, 2-mercaptoethylamine, 3-mercapto-n-propylamine;

2-methoxyethylamine, 2-ethoxyethylamine, 2-propoxyethylamine, 2-butoxyethylamine, 2-pentoxyethylamine, 3 - methoxypropylamine, 4-ethoxybutylamine, 5-propoxypentylamine, 6-ethoxyhexylamine, 7-methoxyheptylamine, 4-butyloxybutylamine, 2 - methylthioethylamine, 2-ethylthioethylamine, (2-aminoethyl)methylsulfoxide, (2-aminoethyl)ethylsulfoxide, (3-aminopropyl)methylsulfoxide;

benzylamine, β - phenylethylamine, γ - phenyl-n-propylamine, phenylcyclopropylamine, 3-phenylcyclobutylamine, 2-phenylcyclopentylamine, 4-phenylcyclohexylamine, 1-phenylcycloheptylamine, 3-phenylcyclooctylamine;

cyclopentylamine, cyclohexylamine, cycloheptylamine, cyclooctylamine;

cyclopenten-2-ylamine, cyclohexen-3-ylamine, cyclohepten-4-ylamine, cycloocten-5-ylamine, 3-methylcyclohexylamine, 4-methylcyclohexen-3-ylamine;

2 - aminodecalin, 1,2,4a,5,6,7,8,8a-octahydro-2-naphthylamine;

2 - aminobicyclo[2,2,1]heptane, 2-aminobicyclo[2,2,1]hept-5-ene, 3-aminobicyclo[3,1,1]heptane, 3-aminobicyclo[3,3,1]nonane, 3-aminobicyclo[3,3,1]non-6-ene, 1-adamantylamine, 2-adamantylamine;

3-aminofuran, 3-aminotetrahydrofuran, 3-aminotetrahydropyran, 2 - aminomethyltetrahydrofuran, 2-aminomethylfuran, 3-aminomethyltetrahydrofuran, 3-aminomethylfuran, 2-aminomethyltetrahydropyran, 3-aminomethyltetrahydropyran, 3-aminomethylpyran, 4-aminomethyltetrahydropyran;

3-aminothiophene, 3-aminotetrahydrothiophene, 3-aminotetrahydrothiopyran, 2 - aminomethyltetrahydrothiophene, 2-aminomethyl - 2,5 - tetrahydrothiophene, 2-aminomethylthiophene, 3-aminomethyltetrahydrothiophene, 3-aminomethylthiophene, 2-aminomethyltetrahydrothiopyran, 3-aminomethyltetrahydrothiopyran, 3-aminomethylthiopyran, 4-aminomethyltetrahydrothiopyran.

When the acylating agent is a cyclohexadienyl acid or an alkali metal salt thereof, an anhydride intermediate is first formed by adding, at lowered temperatures, an organic haloformate to a solution of the acid or alkali metal salt thereof in a water-miscible organic solvent which does not contain an active hydrogen atom. The solvent also contains a tertiary amine. Preferably, an amount of water at least sufficient to dissolve the acid or alkali metal salt thereof is then added and the mixture stirred until completion of the reaction, typically, for from about 10 minutes to about 1 hour to form the anhydride intermediate.

The organic radical of the alkylhaloformate may be an alkyl, aryl or arylalkyl radical. The composition of the radical is not critical as it is lost in the reaction. The essential criterion is that the organic radical does not interfere with the reaction. The lowered temperatures are preferably from about —20° C. to about 10° C. most preferably from about —15° C. to about 0° C. The water-miscible solvent which does not contain an active hydrogen atom may be, for example, a lower alkyl ketone, e.g., acetone; a cycloalkyl ether, e.g., tetrahydrofuran or dioxane; or an N-lower alkyl di-substituted amide, e.g., dimethylformamide or dimethylacetamide.

If the starting material is the free acid, about one equivalent of a tertiary amine is added to the solvent, whereas, if the starting material is the alkali metal salt of the acid, a catalytic amount, e.g., about 1–2 drops of the tertiary amine is added to the solvent to initiate the reaction. The tertiary amine may be a trialkylamine, e.g., triethylamine; a heterocyclic tertiary amine, e.g., pyridine; or an N-lower alkyl heterocyclic tertiary amine, e.g., N-methyl morpholine.

The formation of the anhydride intermediate V by reaction between the cyclohexadienyl acid or alkali metal salt thereof of formula II–$Y^1$ and the organic haloformate of formula IV may be illustrated by the following equation wherein R, $n$ and Z are as defined previously, $Y^1$ is OH or OAlk wherein Alk is an alkali metal, X is halogen, and $R^3$ is an organic radical:

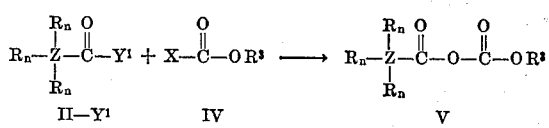

The 1 - $R^2$ - substituted - 3 - [p - (aminoalkyl)phenylsulfonyl] urea VI is then added to the anhydride intermediate preferably in the presence of sufficient tertiary amine to neutralize the acid formed during the reaction and of a quantity of water-organic solvent mixture sufficient to solubilize the final product. The organic solvent may be a water-miscible organic solvent which does not contain an active hydrogen atom, for example, a lower alkyl ketone, e.g., acetone; a cycloalkyl ether, e.g., tetrahydrofuran or dioxane; or an N-lower alkyl di-substituted amide, e.g., dimethylformamide or dimethylacetamide. After stirring until completion of the reaction, typically for a period of several minutes to several hours, more usually from about 20 minutes to about 3 hours, and most usually for from about 0.5 to about 1.5 hours, the reaction is diluted with several volumes of water.

If a solution results at this point, it is extracted with a water-immiscible polar solvent which may be, for example, a halogenated alkane, e.g., chloroform or methylene chloride. The resulting extract is dried to yield the final product. If precipitation occurs after the addition of water, the product may be filtered off directly.

Formation of the compounds of formula I by reaction between the anhydride intermediate of formula V and the 1 - $R^2$ - substituted - 3 - [p - (aminoalkyl)phenylsulfonyl]urea of formula VI may be illustrated by the following equation wherein R, $n$, Z, $R^3$, $R^1$, $m$ and $R^2$ are defined previously:

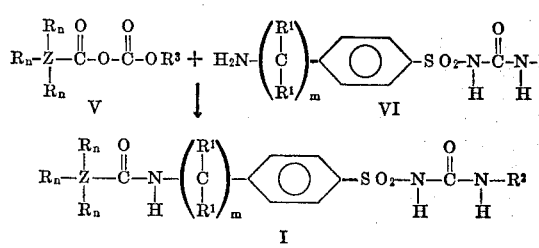

When the acylating agent is a cyclohexadienyl acyl halide, the compounds of formula I may be prepared by reacting the acyl halide with the 1 - $R^2$ - substituted - 3 - [p-(aminoalkyl)-phenylsulfonyl]urea VI in a water-miscible or water-immiscible polar organic solvent, preferably in the presence of a quantity of tertiary amine sufficient to neutralize the acid formed during the reaction. The water-miscible or water-immiscible polar organic solvent may be, for example, a halogenated alkane, e.g., chloroform or methylene chloride; or an N-lower alkyl di-substituted amide, e.g., dimethylformamide or dimethylacetamide. The reaction takes place at temperatures of from about 0° C. to up to about the boiling point of the solvent, preferably at temperatures of from about 10° C. to about 60° C. At the completion of the reaction which may take, typically, from about several minutes to about several hours, usually from about 0.5 hour to about 9 hours, water is added to precipitate the final product. If the polar organic solvent is water-immiscible, the solvent is removed before adding the water.

Formation of the compounds of formula I by reaction between the acyl halide of formula II–$Y^2$ and the substituted urea of formula VI may be illustrated by the following equation wherein R, $n$ Z, $R^1$, $m$ and $R^2$ are as defined previously and $Y^2$ is halogen:

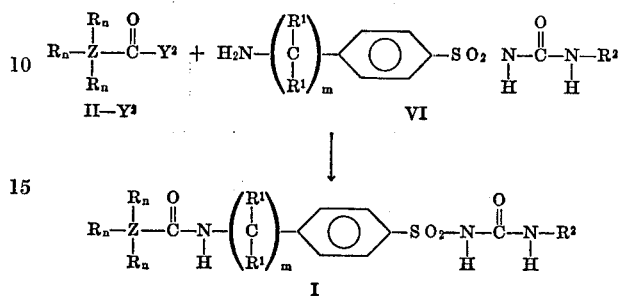

The compounds of formula I may also be prepared in stepwise fashion by reacting either the anhydride intermediate V or the acyl halide II–$Y^2$ with a p-(aminoalkyl) benzene sulfonamide VII and one equialent of a tertiary amine to form a p-[(cyclohexadienyl)amidoalkyl]phenylsulfonamide VIII and reacting the latter with an $R^2$-substituted isocyanate IX as shown by the following equations:

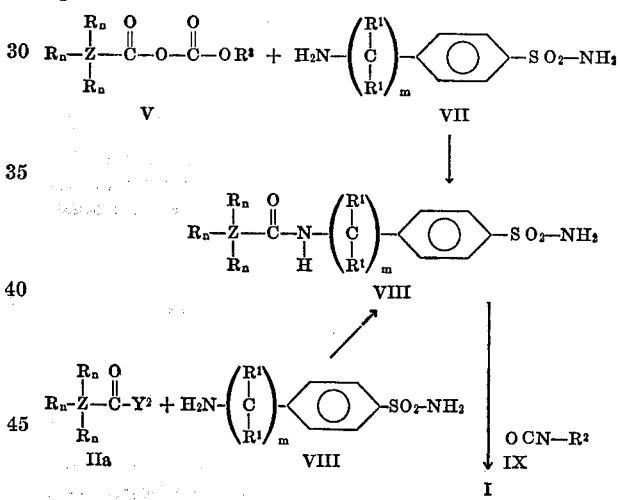

The cyclohexadienyl carboxylic acid used as acylating agent may be prepared by subjecting butadiene or an R-substituted butadiene to a Diels-Alder reaction with an R-substituted propiolic acid, or an ester thereof. This reaction takes place under known conditions for a Diels-Alder reaction. The product formed is the acid of formula IIb or the corresponding ester. Isomerization of the ester with a base (sodium ethoxide or lithium diethylamide) followed by hydrolysis yields the free acid of formula IIa.

Another synthesis resulting in compounds of formula IIe employs benzoic or a substituted benzoic acid as starting material. A benzoic acid of the formula

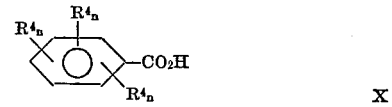

wherein $R^4$ may be hydrogen, lower alkyl, lower alkoxy, cycloalkoxy of from 5 to 6 carbon atoms, cyclohexyl of from 5 to 8 carbon atoms or carboxy, is reacted (1) with lithium, alcohol in liquid ammonia, (2) with $NH_4Cl$, and (3) with $CO_2$ to form the corresponding 2,5-cyclohexadiene carboxylic acid, lithium salt of the formula

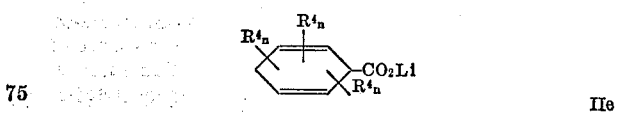

If the zenzoic acid of formula X is (1) reduced with lithium in alcohol and liquid ammonia, (2) the liquid ammonia evaporated, and (3) the residue neutralized to about pH 6.5 with aqueous acid, one obtains a mixture comprising the isomeric 1,4- and 1,5-cyclohexadien carboxylic acids

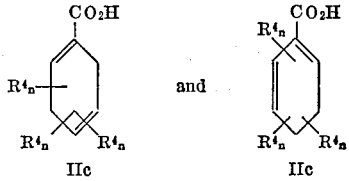

IIc      IIc

If an acid or an ester of formula XI

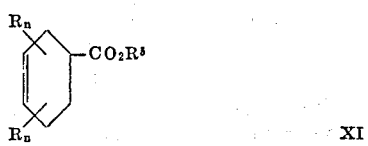

XI wherein $R^5$ is hydrogen or alkyl, are halogenated under free radical conditions (e.g., N-bromosuccinimide, or $BR_2$ and long wave length ultraviolet light, or benzoyl peroxide) and the intermediate dihalide

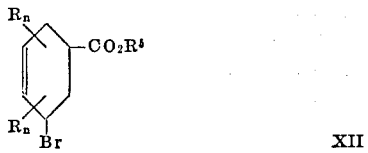

XII heated in the presence of zinc or sodium iodide, one obtains the cyclohexadiene carboxylate of formula IId which, if $R^5$ is alkyl, can be hydrolyzed to the corresponding free acid

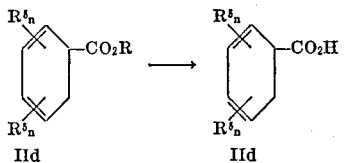

IId      IId

If dienes of formula XIII (wherein R is as defined previously but excluding lower acyloxy) are heated with an α-substituted acrylic acid or ester XIV, one obtains Diels-Alder products of formula XV which on treatment with base (aqueous sodium hydroxide, potassium t-butoxide, sodium ethoxide or lithium diethylamide) gives a cyclohexadiene carboxylate of formula IId or the free acid thereof:

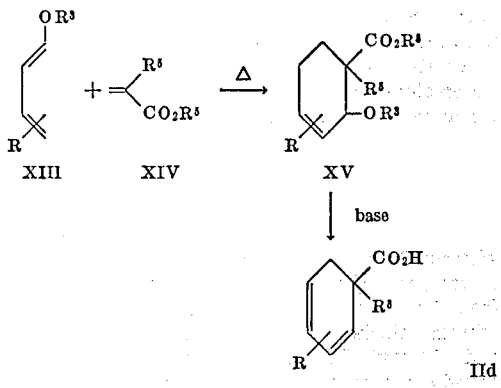

If compounds of formula I are subjected to an aromatizing reaction, for example by refluxing in the presence of sulfur, 2,3-dichloro-5,6-dicyanoquinone or palladium in an appropriate solvent, the corresponding 1-$R^1$-substituted-3-[[p-(benzene)amidoalkyl]phenyl]sulfonyl ureas of formula XVII are obtained:

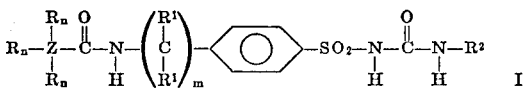

I

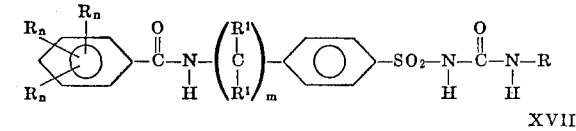

XVII

The compounds of formula I may be used for the manufacture of orally administrable pharmaceutical preparations for the lowering of the blood sugar level in the treatment of diabetes mellitus and may be used as such or in the form of their physiologically tolerable salts or in the presence of substances which cause such salt formation. For the formation of salts, there may be used, for example, alkaline agents such as, for example, alkali metal hydroxides or alkaline earth metal hydroxides, alkali metal carbonates or bicarbonates or also organic bases, in particular tertiary nitrogen bases, provided the resulting salts are physiologically tolerable.

The p - [(cyclohexadienyl)amidoalkyl]phenylsulfonamide compounds of formula VIII as well as the compounds of formula I absorb ultraviolet light and are useful as sun screening agents. The compounds of formula VIII as well as the compounds of formula I are also effective anti-bacterial agents and are useful in inhibiting the growth of bacteria.

The invention, therefore, also provides pharmaceutical preparations for treatment of diabetes mellitus which comprise a compound of the present invention in admixture or conjunction with a pharmaceutically suitable carrier.

The pharmaceutical preparations are advantageously in the form of tablets and the pharmaceutically suitable carrier may be, for example, talc, starch, lactose, tragacanth or magnesium stearate.

A pharmaceutical preparation containing a compound of the present invention as active substance, for example, a tablet or a powder, with or without the aforesaid carriers is advantageously brought into a suitable unit dosage form. The dose chosen should comply with the activity of the specific compound used and the desired effect. Advantageously, the dosage per unit amounts to from about 0.5 to about 500 mg. per kg. of body weight, preferably from about 2 to about 150 mg., but considerably higher or lower dosage units may also be used, which, if desired, are divided or multiplied prior to their administration.

The following examples illustrate the present invention without, however, limiting the same thereto. Unless otherwise indicated, all temperatures given are in degrees centigrade. All reactions may be carried out under an inert atmosphere, such as argon, nitrogen or helium.

EXAMPLE 1

2-Methoxy-2,5-cyclohexadien-1-yl carboxylic acid lithium salt

To a stirred solution of 900 ml. of liquid ammonia cooled in a Dry Ice acetone bath under argon is added 0.05 g. of lithium. To this dried solution is added 30 g. of o-methoxybenzoic acid in 42 ml. of methanol. 8.07 g. of lithium in six equal portions are then added over a period of one hour. After the lithium is consumed, the ammonia is evaporated off at room temperature and the residue dissolved in 400 ml. of water. The resulting aqueous solution is then saturated with carbon dioxide gas for 0.5 hour while cooling at 10° C. The precipitate which forms is filtered off and discarded and the filtrate evaporated to dryness under vacuum. The residue is stirred with 200 ml. of acetone and the insoluble material is filtered off, stirred with 200 ml. of methanol, filtered off and discarded. The methanol filtrate is dried with type 3A molecular sieves. The molecular sieves are filtered off and the filtrate evaporated to dryness under vacuum to give the title compound.

EXAMPLE 2

1-Cyclohexyl-3-[[p-[(2-methoxy-2,5-cyclohexadien-1-yl) formamido]ethyl]phenyl]sulfonyl]urea 1.0 g. of 2-methoxy-2,5-cyclohexadien-1-yl carboxylic acid lithium salt is added to a solution of 2 drops of N-methylmorpholine in 7.7 ml. of acetone at −10° C. To this suspension is added 0.72 g. of ethyl chloroformate followed by 1.6 ml. of water. The solution is stirred at −10° for 20 minutes. At the end of this time 2.16 g. of 3-[p-(2 - amino-ethyl)benzenesulfonyl]-1-cyclohexylurea is added followed by a mixture of 0.84 ml. triethylamine, 9.0 ml. water and 3.0 ml. acetone. After stirring at room temperature for one hour, the reaction is diluted with three volumes of water and the resultant solution extracted with chloroform. The chloroform extract is dried with anhydrous sodium sulfate, filtered and the solvent evaporated under a vacuum to give the title compound which is recrystallized from methanol.

EXAMPLES 3–7

A. Following the procedure of Example 1 but substituting the acids in Column I below for 2-methoxybenzoic acid in Example 1, the corresponding dihydrobenzoic acid lithium salts indicated in Column II are obtained:

| Example: | I | II |
|---|---|---|
| 3a | 5-methyl-2-methoxy benzoic acid. | 5-methyl-2-methoxy-2,5-cyclohexadien-1-yl carboxylic acid lithium salt. |
| 4a | 4-methyl-2-methoxy benzoic acid. | 4-methyl-2-methoxy-2,5-cyclohexadien-1-yl carboxylic acid lithium salt. |
| 5a | 2,4-dimethylbenzoic acid | 2,4-dimethyl-2,5-cyclohexadien-1-yl carboxylic acid lithium salt. |
| 6a | 2-(2-pentyloxy)benzoic acid. | 2-(2-pentyloxy)-2,5-cyclohexadien-1-yl carboxylic acid lithium salt. |
| 7a | p-Cyclohexyloxybenzoid acid. | 4-(cyclohexyloxy)-2,5-cyclohexadien-1-yl carboxylic acid lithium salt. |

B. Following the procedure of Example 2 but substituting the acid salts in Column I below for 2-methoxy-2,5-cyclohexadien-1-yl carboxylic acid lithium salt in Example 2, the corresponding dihydrosulfonylureas in Column II are obtained:

| Example: | I | II |
|---|---|---|
| 3b | 5-methyl-2-methoxy-2,5-cyclohexadien-1-yl carboxylic acid lithium salt. | 1-cyclohexyl-3-[[p-[2-[(5-methyl-2-methoxy-2,5-cyclohexadien-1-yl(formamido]ethyl]phenyl]sulfonyl]urea. |
| 4b | 4-methyl-2-methoxy-2,5-cyclohexadien-1-yl carboxylic acid lithium salt. | 1-cyclohexyl-3-[[p-[2-[(4-methyl-2-methoxy-2,5-cyclohexadien-1-yl) formamido]ethyl]phenyl]sulfonyl]urea. |
| 5b | 2,4-dimethyl-2,5-cyclohexadien-1-yl carboxylic acid lithium salt. | 1-cyclohexyl-3-[[p-[2-[(2,4-dimethyl-2,5-cyclohexadien-1-yl)formamido]ethyl]phenyl]sulfonyl]urea. |
| 6b | 2-(2-pentyloxy(-2,5- cyclohexadien-1-yl carboxylic acid lithium salt. | 1-cyclohexyl-3-[[p-[2-[[2-(2-pentyloxy)-2,5-cyclohexadien-1-yl]formamido]ethyl] phenyl]sulfonyl]urea. |
| 7b | 4-(cyclohexyloxy)-2,5-cyclohexadien-1-yl carboxylic acid lithium salt. | 1-cyclohexyl-3-[[p-[2-[[4-(cyclohexyloxy)-2,5-cyclohexadien-1-yl]formamido]ethyl]phenyl]sulfonyl]urea. |

EXAMPLE 8

A. Methoxyacetylenecarboxylic acid methyl ester

Method A: 14.4 g. of methyl bromopropiolate and 5.4 g. of sodium methoxide in 100 ml. anhydrous methanol are refluxed for five hours. The solvent is evaporated off and the residue extracted with ether. The ether extracts are then evaporated to give the title compound.

Method B: To a stirred solution of methyl-lithium obtained from 2.7 g. of lithium and 30 g. of methyl iodide in 150 ml. of absolute ether and containing 0.131 mole of methyl-lithium (estimated by titration of a sample) is added a solution of 13 g. of methoxyacetylene in 40 ml. of absolute ether. The mixture is refluxed until the evolution of methane ceases, then cooled to −15° to −20°, when a solution of 14 g. of methyl chlorocarbonate in 40 ml. of ether is added drop by drop, care being taken that the temperature does not rise above −15°. When the addition is complete, the temperature is allowed to rise to 0°, whereupon the mixture is shaken with ice-water. The ethereal layer is dried and the solvent evaporated in vacuum to give the title compound.

B. 4-Chloro - 2 - methoxy - 1,4 - cyclohexadien-1-yl carboxylic acid methyl ester and 5-chloro-2-methoxy-1,4-cyclohexadien-1-yl carboxylic acid methyl ester 11.4 g. of methoxyacetylenecarboxylic acid methyl ester, 8.8 g. of chloroprene and 0.1 g. of hydroquinone in 50 ml. toluene are heated at 120° for 18 hours under argon. The reaction mixture is then diluted with 100 ml. benzene and extracted with aqueous sodium bicarbonate and then with water. The organic phase is dried and the solvent evaporated to give a mixture of the title compounds. The mixture is separated into the individual components by preparative vapor phase chromatography.

EXAMPLE 9

A. 5-Chloro-2-methoxy-1,4-cyclohexadien-1-yl carboxylic acid 20.2 g. of 5-chloro-2-methoxy-1,4-cyclohexadien-1-yl carboxylic acid methyl ester and 35.0 g. of potassium bicarbonate in 300 ml. methanol containing 50 ml. water are stirred at 18° for 45 hours. The reaction is concentrated in vacuo at 35° to a volume of approximately 50 ml., diluted with water and extracted with ether. The aqueous phase is then cooled, stirred and cautiously acidified to pH 6 with 6N hydrochloric acid. This solution is then extracted with chloroform and the chloroform extracts dried, filtered and evaporated to give the title compound.

B. 1-Cyclohexyl-3-[[p-[2-[(5 - chloro - 2 - methoxy-1,4-cyclohexadien - 1 - yl)formamide]ethyl]phenyl]sulfonyl]urea Following the procedure of Example 2 but substituting the product formed in part A for 2-methoxy-2,5-cyclohexadien-1-yl carboxylic acid lithium salt plus one equivalent of triethylamine, the title compound is obtained.

EXAMPLE 10

A. 4-Methoxy-1,4-cyclohexadiene - 1,3 - dicarboxylic acid

To a stirred solution of 900 ml. of liquid ammonia cooled in a Dry Ice acetone bath under argon is added 0.05 g. of lithium followed by 10 g. of 4-methoxyisophthalic acid in a solution of 20 ml. methanol and 300 ml. tetrahydrofuran. 2.0 g. of lithium is then added and the reaction mixture is stirred until the lithium is completely reacted. 17.5 g. of ammonium chloride is then added and the ammonia evaporated at room temperature. 100 ml. of water is added to the residue and carbon dioxide is then bubbled through the solution for one hour. The solvent is then evaporated and the residue stirred with 200 ml. methanol. The precipitate is filtered off and discarded and the filtrate evaporated to yield the dilithium salt of the title compound. This salt is dissolved in methanol and treated with two molar equivalents of concentrated hydrochloric acid. The solution is dried with molecular sieves and filtered through a silica gel column. The eluant is evaporated to give the title compound.

B. 5-Bromo-2-methoxy-2,5-cyclohexadien-1-ylcarboxylic acid 19.5 g. of 4 - methoxy-1,4-cyclohexanediene-1,3-dicarboxylic acid in sufficient ethanol to bring about solution is treated with 24.9 g. of thallous ethoxide. The suspension is stirred for one hour and the thallous salt is filtered off and vacuum dried. 39.8 g. of this salt is suspended in 100 ml. of dibromoethane, 15.9 g. of bromine is added and the stirred suspension is heated at 70° C. for three hours. The reaction is cooled to room temperature and the precipitate filtered off and discarded. The filtrate is filtered through a column of Florisil and the elutant evaporated to give the title compound.

C. 1-Cyclohexyl-3-[[p-[2-[(5-bromo-2-methoxy-2,5-cyclohexadien-1-yl)formamido]ethyl]phenyl]sulfonyl]urea Following the procedure in Example 2 but substituting 5 - bromo-2-methoxy-2,5-cyclohexadiene-1-carboxylic acid for 2 - methoxy-2,5-cyclohexadien-1-yl carboxylic acid lithium salt and adding 0.86 ml. of triethylamine with the acid, the title compound is obtained.

EXAMPLE 11

1 - Cyclohexyl - 3-[[p-[2-[(5-chloro-2-methoxy-2,5-cyclohexadien-1-yl)formamido]ethyl]phenyl]sulfonyl]urea Following the procedure of Example 8 but substituting 0.1 mole of Cl$_2$ for the Br$_2$ in part B, the title compound is obtained.

EXAMPLE 12

1-Cyclohexyl-3-[[p-[2-(2-methoxybenzamido)ethyl]phenyl]-sulfonyl]urea 1.17 g. of 1-cyclohexyl-3-[[p-[2-[(2-methoxy-2,5-cyclohexadien - 1 - yl)formamido]ethyl]phenyl]sulfonyl]urea and 0.628 g. of dichlorodicyanoquinone in 70 ml. dioxane are refluxed for 18 hours. The reaction is cooled to room temperature and the solvent evaporated to give the product. The product is purified by preparative thin layer chromatography on 1,000μ silica gel plates. After elution with a chloroform-ethanol mixture (95:5), the band with an R$_f$ of 0.4 to 1.0 is scraped off and extracted with ethyl acetate-methanol (9:1). The silica gel is filtered off and the filtrate evaporated to give the purified product.

EXAMPLE 13

1-Cyclohexyl-3-[[p-[2-(5-chloro-2-methoxy-benzamido)ethyl]phenyl]sulfonyl]urea 4.95 g. of 1-cyclohexyl-3-[[p-[2-[(5-chloro-2-methoxy-1,4 - cyclohexadien - 3-yl)formamido]ethyl]phenyl]sulfonyl]urea and 3.3 g. of powdered sulfur are refluxed in 50 ml. dimethylformamide for three hours. After the solvent is evaporated, the residue is stirred with a minimum amount of carbon disulfide and the title compound is filtered off.

EXAMPLE 14

A. 2,5-Dimethyl-2,5-cyclohexadien-1-yl carboxylic acid 20 g. of 2,5-dimethylbenzoic acid is added to 160 ml. methanol in 400 ml. liquid ammonia at −20° C. 16.4 g. of sodium are added to the stirred solution over a period of one hour. After the sodium is digested, 80 g. of ammonium chloride is added and the ammonia evaporated. The residue is dissolved in water, filtered and the filtrate acidified with 20% hydrochloric acid. The acidified suspension is extracted with methylene chloride. The methylene chloride extracts are dried, filtered and the solvent evaporated to give the title compound.

B. 2,5-Dimethyl-2,5-cyclohexadiene-1-carboxylic acid chloride

A solution of 5 g. of 2,5-dimethyl-2,5-cyclohexadiene-1-carboxylic acid and 10 ml. of oxalyl chloride in 50 ml. of ether is stirred at room temperature for twenty hours. The solvent and excess oxalyl chloride are then evaporated off to give the title compound.

C. p-[2-[(2,5-Dimethyl-2,5-cyclohexadien-1-yl)formamidoethyl]phenylsulfonamide To 4.4 g. of p-(β-aminomethyl)benzene sulfonamide and 2.2 g. of N-methylmorpholine in 40 ml. dimethylacetamide is added, with cooling, over a 0.5 hour period, 4.0 g. of 2,5 - dimethyl-2,5-cyclohexadiene-1-carboxylic acid chloride. The reaction is stirred for two hours at room temperature and then poured into 250 ml. water. The title compound is filtered off and dried.

D. 1 - (4-Methylcyclohexyl)-3-[[p-[2-[(2,5-dimethyl-2,5-cyclohexadien - 1-yl)formamido]ethyl]phenyl]sulfonyl urea 3.2 g. of 4-methylcyclohexylisocyanate is added at 0° with stirring to a solution of 5.5 g. of p-[2-[(2,5-dimethyl - 2,5 - cyclohexadien - 1-yl) formamido]ethyl]phenylsulfonamide and 6.4 ml. of 10% aqueous sodium hydroxide in 200 ml. 50% aqueous acetone. After the isocyanate is added, the reaction mixture is stirred at 5° for one hour and then allowed to come to room temperature and stirred for an additional two hours. 150 ml. of water is added and the precipitate is filtered off and discarded. The acetone is evaporated off from the filtrate and the residual aqueous solution is made acidic with 20% hydrochloric acid. The title compound is filtered off and dried.

EXAMPLES 15–32

Following the procedure of Example 2 but substituting the acids listed in Column I below for 2-methoxy-2,5-cyclohexadien-1-yl carboxylic acid lithium salt and adding 0.86 ml. of triethylamine with the acid, the corresponding benzenesulfonyl ureas listed in Column II below are obtained:

| Example: | I | II |
| --- | --- | --- |
| 15 | 4 - cyclohexyl - 1,3 - cyclohexadien-1-yl carboxylic acid. | 1-cyclohexyl-3-[[p-[2-[(4-cyclohexyl-1,3-cyclohexadien-1-yl)formamido]ethyl]phenyl]sulfonyl]urea. |
| 16 | 4-(2-butyl)-1,5-cyclohexadien-1-yl carboxylic acid. | 1-cyclohexyl-3-[[p-[2-[(4-(2-butyl)-1,5-cyclohexadien-1-yl)formamido]ethyl]phenyl]sulfonyl]urea. |
| 17 | 3-methyl-2,5-cyclohexadien-1-yl carboxylic acid. | 1-cyclohexyl-3-[[p-[2-[(3-methyl-2,5-cyclohexadien-1-yl)formamido]ethyl]phenyl]sulfonyl]urea. |
| 18 | 1,2,4-trimethyl-3,5-cyclohexadien-1-y-l carboxylic acid. | 1-cyclohexyl-3-[[p-[2-[(1,2,4-trimethyl-3,5-cyclohexadien-1-yl)formamido]ethyl]phenyl]sulfonyl]urea. |
| 19 | 4-phenyl-1,4-cyclohexadien-1-yl carboxylic acid. | 1-cyclohexyl-3-[[p-[2-[(4-phenyl - 1,4 - cyclohexadien-1-yl)formamido]ethyl]phenyl]sulfonyl]urea. |
| 20 | 2,4-cyclohexadien-1-yl carboxylic acid. | 1-cyclohexyl-3-[[p-[2-[(2,1'-cyclohexadiene-1-yl)formamido]ethyl]phenyl]sulfonyl]urea. |
| 21 | 1,5-cyclohexadien-1-yl carboxylic acid. | 1-cyclohexyl-3-[[p-[2-[(1,5-cyclohexadien-1-yl)formamido]ethyl]phenyl]sulfonyl]urea. |
| 22 | 3-chloro-5,5-dimethyl-1,3-cyclohexadien-1-yl carboxylic acid. | 1-cyclohexyl-3-[[p-[2-[(3-chloro-5,5-dimethyl-1,3-cyclohexadien-1-yl)formamido]ethyl]phenyl]sulfonyl]urea. |
| 23 | 3,6-bis(o-methylurethane)-1,4-cyclohexadien-1-yl carboxylic acid. | 1-cyclohexyl-3-[[p-[2-[[3,6-bis(o-methylurethane)-1,4-cyclohexadien-1-yl]formamido]ethyl]phenyl]sulfonyl]urea. |
| 24 | 6-acetoxy-1,4-cyclohexadien-1-yl carboxylic acid. | 1-cyclohexyl-3-[[p-[2-[(6-acetoxy-1,4-cyclohexadien-1-yl)formamido]ethyl]phenyl]sulfonyl]urea. |
| 25 | 4-cyclohexyl-1,4-cyclohexadien-1-yl carboxylic acid. | 1-cyclohexyl-3-[[p-[2-[(4-cyclohexyl-1,4-cyclohexadien-1-yl)formamido]ethyl]phenyl]sulfonyl]urea. |
| 26 | 4-benzyl-5-methyl-1,4-cyclohexadien-1-yl carboxylic acid. | 1-cyclohexyl-3-[[p-[2-[(4-benzyl-5-methyl-1,4-cyclohexadien-1-yl)formamido]ethyl]phenyl]sulfonyl]urea. |
| 27 | 4-nitro-1,4-cyclohexadien-1-yl carboxylic acid. | 1-cyclohexyl-3-[[p-[2-[(4-nitro-1,4-cyclohexadien-1-yl)formamido]ethyl]phenyl]sulfonyl]urea. |

| Example: | I | II |
|---|---|---|
| 28 | 3,6-bisphenylsulfonyl-1,4-cyclohexadien-1-yl carboxylic acid. | 1-cyclohexyl-3-[[p-[2-[(3,6-bisphenylsulfonyl-1,4-cyclohexadien-1-yl)formamido]ethyl]phenyl]sulfonyl]urea. |
| 29 | 6-cyano-1,4-cyclohexadien-1-yl carboxlyic acid. | 1-cyclohexyl-3-[[p-[2-[(6-cyano-1,4-cyclohexadien-1-yl)formamido]ethyl]phenyl]sulfonyl]urea. |
| 30 | 5-trifluoromethyl-1,4-cyclohexadien-1-yl carboxylic acid. | 1-cyclohexyl-3-[[p-[2-[(5-trifluoromethyl-1,4-cyclohexadien-1-yl)formamido]ethyl]phenyl]sulfonyl]urea. |
| 31 | 4-carbomethoxy-1,4-cyclohexadien-1-yl carboxylic acid. | 1-cyclohexyl-3-[[p-[2-[(4-carbomethoxy-1,4-cyclohexadien-1-yl)formamido]ethyl]phenyl]sulfonyl]urea. |
| 32 | 2-acetyl-1,4-cyclohexadien-1-yl carboxylic acid. | 1-cyclohexyl-3-[[p-[2-[(2-acetyl-1,4-cyclohexadien-1-yl)formamido]ethyl]phenyl]sulfonyl]urea. |

EXAMPLE 33 p-[2-[(2-Methoxy-2,5-cyclohexadien-1-yl) formamido]ethyl]-phenylsulfonamide

Following the procedure of Example 2 but substituting p-(2-aminoethyl)benzenesulfonamide for 3-[p-(2-aminoethyl)benzenesulfonyl] - 1 - cyclohexylurea in Example 2, the title compound is obtained.

EXAMPLE 34

Following the procedure of Example 8 but substituting sodium methyl mercaptide for sodium methoxide in Example 8A, the corresponding 4-chloro-2-methylthio-1,4-cyclohexadien-1-yl carboxylic acid methyl ester and 5-chloro-2-methylthio-1,4-cyclohexadien-1-yl carboxylic acid methyl ester are obtained.

EXAMPLE 35

3,6-Bisisocyanato-1,4-cyclohexadien-1-yl carboxylic acid methyl ester

Following the procedure of Example 8B but substituting 1,4-bisisocyanato-1,3-butadiene for chloroprene and methyl propiolate for methoxyacetylene carboxylic acid methyl ester, the title compound is obtained.

EXAMPLE 36

3,6-bis(o-methylurethane)-1,4-cyclohexadien-1-yl carboxylic acid methyl ester 0.5 moles of 1,4-bisisocyanato-1,4-cyclohexadien-1-yl carboxylic acid methyl ester in sufficient tetrahydrofuran to effect solution is refluxed with 1.0 moles of methanol. After 12 hours the solvent is evaporated to give the title product.

EXAMPLE 37

3,6-bis(o-methylurethane)-1,4-cyclohexadien-1-yl carboxylic acid

Following the procedure of Example 9 but substituting 1,4-bis(o-methylurethane) - 1,4 - cyclohexadien-1-yl carboxylic acid methyl ester for 5-chloro-2-methoxy-1,4-cyclohexadien-1-yl carboxylic acid methyl ester in Example 9, the title compound is obtained.

EXAMPLE 38

A. 2-Ethoxy-1,4,6-trimethyl-3-cyclohexen-1-yl carboxylic acid methyl ester

One mole of 1-ethoxy-3-methyl-1,3-butadiene and 0.5 moles of methyl 2-methylmethacrylate are heated at 150° for 6 hours in a glass autoclave to give the title compound.

B. 1,2,4-Trimethyl-3,5-cyclohexadien-1-yl carboxylic acid 0.1 Mole of 2-ethoxy-1,4,6-trimethyl-3-cyclohexen-1-yl carboxylic acid methyl ester and 0.4 mole of 20% aqueous sodium hydroxide are refluxed for 36 hours. The reaction mixture is cooled, neutralized with concentrated hydrochloric acid, and extracted with ether. The ether extracts are dried and evaporated to give the title compound.

EXAMPLE 39

4-Cyclohexyl-1,3-cyclohexadien-1-yl carboxylic acid 0.1 Mole of 4-cyclohexyl-1,4-cyclohexadien-1-yl carboxylic acid and 0.2 mole of sodium ethoxide in 1,000 ml. tetrahydrofuran are refluxed for twenty-four hours. The reaction is cooled, neutralized with 0.2 mole of concentrated hydrochloric acid, and evaporated to give the title compound.

EXAMPLES 40–48

Following the procedure of Example 8B but substituting the dienes in Column I below for chloroprene and propiolic acid for methoxyacetylene carboxylic acid methyl ester in Example 8B, the corresponding substituted methyl cyclohexadienecarboxylate(s) indicated below in Column II are obtained and separated (where necessary) by vapor phase chromtography:

| | I | II |
|---|---|---|
| Example: | | |
| 40 | 1-acetoxy-1,3-butadiene | 3- (and 6-) acetoxy-1,4-cyclohexadien-1-yl carboxylic acid. |
| 41 | 1,4-bisbenzylthio-1,3-butadiene. | 3,6-bisbenzylthio-1,4-cyclohexadien-1-yl carboxylic acid. |
| 42 | 2-cyclohexyl-1,3-butadiene | 4- (and 5-) cyclohexyl-1,4-cyclohexadien-1yl carboxylic acid. |
| 43 | 2-benzyl-3-methyl-1,3-butadiene. | 4- (and 5-) benzyl-5- (and 4-) methyl-1,4-cyclohexadien-1-yl carboxylic acid. |
| 44 | 2-nitro-1,3-butadiene | 4- (and 5-) nitro-1,4-cyclohexadien-1-yl carboxylic acid. |
| 45 | 1,4-bisphenylsulfonyl-1,3-butadiene. | 3,6-bisphenylsulfonyl-1,4-cyclohexadien-1-yl carboxylic acid. |
| 46 | 1-cyano-1,3-butadiene | 3- (and 6-) cyano-1,4-cyclohexadien-1-yl carboxylic acid. |
| 47 | 2:trifluoromethyl-1,3-butadiene. | 4- (and 5-) trifluoromethyl-1,4-cyclohexadien-1-yl carboxylic acid. |
| 48 | 2-benzyl-1,3-butadiene | 4-benzyl-1,4-cyclohexadien-1-yl carboxylic acid. |

EXAMPLE 49

3-Methyl-2,5-dibromo-3-cyclohexen-1-yl carboxylic acid methyl ester

A. 0.1 Mole of 3-methyl-3-cyclohexen-1-yl carboxylic acid methyl ester and 0.2 mole of N-bromosuccinimide in sufficient carbon tetrachloride to effect solution are refluxed and simultaneously irradiated with a long-wave length ultraviolet light for four hours. The solution is cooled, filtered and the filtrate washed first with cold 0.1 N sodium hydroxide and then with water. The carbon tetrachloride phase is dried and evaporated to give the title compound.

B. 3-Methyl-2,5-cyclohexadien-1-yl carboxylic acid methyl ester: 0.1 Mole of 3-methyl-2,5-dibromo-3-cyclohexen-1-yl carboxylic acid methyl ester and 9 g. zinc dust in 100 ml. 95% ethanol are refluxed for 2 hours. The solvent is evaporated and the residue stirred with 100 ml. ether. The precipitate is filtered off and the filtrate evaporated to give the title compound.

C. 3-Methyl-2,5-cyclohexadien-1-yl carboxylic acid: Following the procedure of Example 9 but substituting 3-methyl-2,5-cyclohexadien-1-yl carboxylic acid methyl ester for 5-chloro-2-methoxy-1,4-cyclohexadien-1-yl carboxylic acid methyl ester in Example 7, the title compound is obtained.

EXAMPLE 50

Following the procedure of Example 9 but substituting 5-chloro-2-methylthio - 1,4-cyclohexadien-1-yl carboxylic acid methyl ester for 5-chloro-2-methoxy-1,4-cyclohexadien-1-yl carboxylic acid methyl ester in Example 9A, the corresponding 1-cyclohexyl-3-[[p-[2 - [(5-chloro-2- methylthio-1,4 - cyclohexadien - 1-yl)formamide]ethyl]phenyl]sulfonyl]urea is obtained.

EXAMPLE 51

5.12 g. of 1-cyclohexyl-3-[[p-[2-[(5-chloro-2-methylthio-1,4 - cyclohexadien - 1-yl)formamide]ethyl]phenyl]sulfonyl]urea and 1.72 g. of meta-chloroperbenzoic acid in sufficient chloroform to effect solution are refluxed until the majority of the product is reacted (as shown by thin layer chromatographic analysis). The solvent is then evaporated and the product, 1-cyclohexyl-3-[[p-[2-[(5-chloro-2 - methylsulfinyl - 1,4 - cyclohexadien-1-yl)formamido]ethyl]phenyl]sulfonyl]urea, is purified by preparative thin-layer chromatography.

EXAMPLE 52

Following the procedure of Example 51 but using 3.44 g. of meta-chloroperbenzoic acid instead of 1.74 g., the corresponding 1-cyclohexyl-3 - [[p-[2-[(5-chloro-2-methylsulfonyl-1,4 - cyclohexadien - 1-yl)formamido]ethyl]phenyl]sulfonyl]urea is obtained.

EXAMPLE 53

4-(2-Butyl)-1,5-cyclohexadien-1-yl carboxylic acid

To 21.8 g. of p-(2-butyl)-benzoic acid in 120 ml. dry ethyl ether and 350 ml. liquid ammonia at −70° is added 3.6 g. of lithium. The reaction was stirred for 12 minutes and then 33 ml. of dry ethanol are added. After the blue color has disappeared, the solvent is evaporated. The residue is neutralized to pH 6 with dilute hydrochloric acid, extracted with ether and the ether evaporated to give the title compound.

EXAMPLE 54

1-(4-Methylcyclohexyl)-3-[[p-[2-[(2,5 - dimethyl-2,5-cyclohexadien - 1-yl)formamido]ethyl]phenyl]sulfonyl]urea 0.2 Mole of p - [2 - [(2,5 - dimethyl - 2,5 - cyclohexadien-1-yl)formamido]ethyl]phenylsulfonamide, 82 g. of potassium hydroxide and 26 ml. of ethyl chloroformate in 400 ml. acetone are refluxed for 7 hours. The reaction is cooled and 400 ml. of water added. The upper layer is separated, the acetone evaporated off and the residue adjusted to pH 6 with acetic acid. The residual starting material is filtered off and the filtrate adjusted to pH 3. The product, ethyl-N-[p-[2-[(2,5-dimethyl-2,5-cyclohexadien-1 - yl)formamido]ethyl]phenylsulfonyl]urethane, is filtered off and dried.

38 g. of this urethane is suspended in 30 ml. of dimethylformamide. 10 g. of 4-methylformamide. 10 g. of 4-methylcyclohexylamine is added and the reaction mixture is heated for one hour at 90° and for one-half hour at 110°. The solution is diluted with water, cooled and the title compound filtered off.

EXAMPLE 55

1-(4-Methylcyclohexyl) - 3 - [[p-[2-[(2,5 - dimethyl-2,5-cyclohexadien - 1 - yl)formamido]ethyl]phenyl]sulfonyl]urea Following the procedure of Example 14D but substituting 4-methylcyclohexylisothiocyanate for 4-methylcyclohexylisocyanate in Example 14D, the corresponding 1-(4-methylcyclohexyl) - 3 - [[p-[2-[(2,5-dimethyl-2,5-cyclohexadien - 1-yl)-formamido]ethyl]phenyl]sulfonyl]thiourea is obtained.

To 13.6 g. of mercuric chloride in 120 ml. water is added dropwise 50 ml. of 2N sodium hydroxide solution while stirring. The precipitated mercuric oxide is added to 18.6 g. of the above thiourea dissolved in a mixture of 40 ml. 1N sodium hydroxide solution and 40 ml. dimethylformamide at 40°. Stirring is continued for 2½ hours at ca. 45°. The mercuric sulfide is then filtered off and the filtrate acidified to ca. pH 3 to give the title compound.

EXAMPLE 56

1-(4-Methylcyclohexyl) - 3 - [[p-[3-[(2,5 - dimethyl-2,5-cyclohexadien - 1 - yl)formamido]propyl]phenyl]sulfonyl]urea Following the procedure of Example 14 but substituting p-(γ-aminopropyl)benzene sulfonamide for p-(β-aminoethyl)benzene sulfonamide in Part C of Example 14, the title compound is obtained.

EXAMPLE 57

1-(4-Methylcyclohexyl) - 3 - [[p-[1-[(2,5 - dimethyl-2,5-cyclohexadien - 1 - yl)formamido]ethyl]phenyl]sulfonyl]urea Following the procedure of Example 14 but substituting p-(α-aminomethyl)benzene sulfonamide for p-(β-aminoethyl)benzene sulfonamide in Part C of Example 14, the title compound is obtained.

EXAMPLE 58

1-(4-Methylcyclohexyl) - 3 - [[p-[2-[(2,5 - dimethyl-2,5-cyclohexadien - 1 - yl)formamido]propyl]phenyl]sulfonyl]urea Following the procedure of Example 14 but substituting p-(β-aminopropyl)benzene sulfonamide for p-(β-aminoethyl)benzene sulfonamide in Part C of Example 14, the title compound is obtained.

EXAMPLE 59

1-(4 - Methylcyclohexyl) - 3 - [[p-[2-[(2-methoxy-2,5-cyclohexadien - 1 - yl)formamido]ethyl]phenyl]sulfonyl]urea Following the procedure of Example 14D but substituting p-[2-[(2 - methoxy - 2,5 - cyclohexadien-1-yl)formamido]ethyl]phenylsulfonamide prepared as described in Example 33 for p-[2-[(2,5-dimethyl - 2,5 - cyclohexadien-1-yl)formamido]ethyl]phenylsulfonamide, the title compound is obtained.

EXAMPLE 60

1-Cyclooctyl - 3 - [[p - [2-[(2,5-dimethyl-2,5-cyclohexadien-1-yl)formamido]ethyl]phenyl]sulfonyl]urea 32.2 g. of the sodium salt of p-[2-[(2,5-dimethyl-2,5-cyclohexadien - 1 - yl)foramido]ethyl]phenylsulfonamide (prepared from the sulfonamide and an equimolar amount of sodium hydride in tetrahydrofuran) and 15.6 g. of cyclooctylurea are mixed in a mortar and then heated for 6 hours at 150° on an oil bath. The cooled reaction mixture is dissolved in water, filtered and the filtrate acidified to ca. pH 3 to give the title compound.

EXAMPLE 61

1-Cyclooctyl-3-[[p-[2-[(2,5-dimethyl-2,5-cyclohexadien-1-yl)formamido]ethyl]phenyl]sulfonyl]urea 16.6 g. of the sulfonamide sodium salt in Example 60, 7 g. of potassium carbonate and 18.5 g. of cyclooctylcarbamic acid methyl ester are thoroughly mixed and then heated for 3 hours at 130° in an oil bath. The cooled reaction mixture is combined with water, washed with ether, and acidified to ca. pH 3 to give the title compound.

EXAMPLE 62

1-Cyclooctyl-3-[[p-[2-[(2,5-dimethyl-2,5-cyclohexadien-1-yl)formamido]ethyl]phenyl]sulfonyl]urea Following the procedure of Example 61 but substituting cyclooctylthiocarbamic acid ethyl ester (prepared from cyclooctylamine and ethyl chlorothioformate) for cyclooctylcarbamic acid methyl ester, the title compound is obtained.

EXAMPLES 63–79

Following the procedure of Example 54 but substituting the amines in Column I below for 4-methylcyclohexylamine in Example 54, the corresponding substituted benzenesulfonylureas indicated in Column II are obtained:

| Example: | I | II |
|---|---|---|
| 63 | Ammonia | p-[2-[(2,5-dimethyl-2,5-cyclohexadien-1-yl)formamido]ethyl]phenylsulfonylurea. |
| 64 | Ethylamine | 1-ethyl-3-[[p-[2-[(2,5-dimethyl-2,5-cyclohexadien-1-yl)formamido]ethyl]phenyl]sulfonyl]urea. |
| 65 | Allylamine | 1-(3-allyl)-3-[[p-[2-[(2,5-dimethyl-2,5-cyclohexadien-1-yl)formamido]ethyl]phenyl]sulfonyl]urea. |
| 66 | 2-methoxyethylamine | 1-(2-methoxyethyl)-3-[[p-[2-[(2,5-dimethyl-2,5-cyclohexadien-1-yl)formamido]ethyl]phenyl]sulfonyl]urea. |
| 67 | 2-methylmercaptoethylamine | 1-(2-methylmercaptoethyl)-3-[[p-[2-[(2,5-dimethyl-2,5-cyclohexadien-1-yl)formamido]ethyl]phenyl]sulfonyl]urea. |
| 68 | (2-aminoethyl)ethylsulfoxide | 1-[2-(ethylsulfinyl)ethyl]-3-[[p-[2-[(2,5-dimethyl-2,5-cyclohexadien-1-yl)formamido]ethyl]phenyl]sulfonyl]urea. |
| 69 | β-Phenethylamine | 1-(β-phenethyl)-3-[[p-[2-[(2,5-dimethyl-2,5-cyclohexadien-1-yl)formamido]ethyl]phenyl]sulfonyl]urea. |
| 70 | Trans-phenylcyclopropylamine | 1-(trans-phenylcyclopropyl)-3-[[p-[2-[(2,5-dimethyl-2,5-cyclohexadien-1-yl)formamido]ethyl]phenyl]sulfonyl]urea. |
| 71 | Cycloheptylamine | 1-cycloheptyl-3-[[p-[2-[(2,5-dimethyl-2,5-cyclohexadien-1-yl)formamido]ethyl]phenyl]sulfonyl]urea. |
| 72 | Cyclohexen-3-ylamine | 1-(cyclohexen-3-yl)-3-[[p-[2-[(2,5-dimethyl-2,5-cyclohexadien-1-yl)formamido]ethyl-phenyl]sulfonyl]urea. |
| 73 | 1,2,4a,5,6,7,8,8a-octahydro-2-naphthylamine | 1-(2-1,2,4a,5,6,7,8,8a-octahydronaphthalene)-3-[[p-[2-[(2,5-dimethyl-2,5-cyclohexadien-1-yl)formamido]ethyl]phenyl]sulfonyl]urea. |
| 74 | 2-aminobicyclo-[2,2,1]-heptane | 1-(2-bicyclo[2,2,1]heptyl)-3-[[p-[2-[(2,5-dimethyl-2,5-cyclohexadien-1-yl)formamido]ethyl]phenyl]sulfonyl]urea. |
| 75 | 1-adamantylamine | 1-(1-adamantyl)-3-[[p-[2-[(2,5-dimethyl-2,5-cyclohexadien-1-yl)formamido]ethyl]phenyl]sulfonyl]urea. |
| 76 | 3-aminofuran | 1-(3-furyl)-3-[[p-[2-[(2,5-dimethyl-2,5-cyclohexadien-1-yl)formamido]ethyl]phenyl]sulfonyl]urea. |
| 77 | 4-aminotetrahydropyran | 1-(4-tetrahydropyranyl)-3-[[p-[2-[(2,5-dimethyl-2,5-cyclohexadien-1-yl)formamido]ethyl]phenyl]sulfonyl]urea. |
| 78 | 2-aminomethyltetrahydrofuran | 1-(tetrahydrofuran-2-yl methyl)-3-[[p-[2-[(2,5-dimethyl-2,5-cyclohexadien-1-yl)formamido]ethyl]phenyl]sulfonyl]urea. |
| 79 | 2-aminothiophene | 1-(2-thiophenyl)-3-[[p-[2-[(2,5-dimethyl-2,5-cyclohexadien-1-yl)formamido]ethyl]phenyl]sulfonyl]urea. |

EXAMPLE 80

1-Cyclohexyl-3-[[p-[2-[(4-carboxy-1,4-cyclohexadien-1-yl)formamido]ethyl]phenyl]sulfonyl]urea Following the procedure of Example 9 but substituting 1-cyclohexyl - 3 - [[p-[2-[(4-carbomethoxy - 1,4 - cyclohexadien - 1 - yl)formamido]ethyl]phenyl]sulfonyl]urea for 5-chloro-2-methoxy-1,4-cyclohexadien-1-yl carboxylic acid methyl ester, the title compound is obtained.

EXAMPLE 81

2-Acetyl-1,4-cyclohexadien-1-yl carboxylic acid methyl ester 0.12 Mole of butadiene, 0.1 mole of 4-oxobut-2-ynoic acid methyl ester and 0.1 g. of hydroquinone in 50 ml. of toluene are heated at 100° for 18 hours under argon. The reaction mixture is diluted with 100 ml. benzene, washed with aqueous sodium bicarbonate and then with water. The organic phase is dried and the solvent evaporated to give the title compound.

EXAMPLE 82

2-Acetyl-1,4-cyclohexadien-1-yl carboxylic acid

Following the procedure of Example 9 but substituting 2-acetyl-1,4-cyclohexadien-1-yl carboxylic acid methyl ester for 5-chloro-2-methoxy-1,4-cyclohexadien-1-yl carboxylic acid methyl ester in Example 9, the title compound is obtained.

EXAMPLE 83

1-(Hexahydro - 1H - azepine-1-yl) - 3 - [[p-[2-[(2,5-dimethyl - 2,5 - cyclohexadien - 1 - yl)formamido]ethyl]phenyl]sulfonyl]urea Following the procedure of Example 54 but substituting an equivalent amount of 1-amino-hexamethyleneimine for the methylcyclohexylamine, the title compound is obtained.

EXAMPLE 84

1-Cyclohexyl-3-[[p-[2-[3,6-bisbenzylthio-1,4-cyclohexadienyl-1-yl)formamido]ethyl]phenyl]sulfonyl]urea Following the procedure of Example 2 but substituting 3,6-bisbenzylthio-1,4-cyclohexadien-1-yl carboxylic acid for 2-methoxy-2,5-cyclohexadien-1-yl carboxylic acid lithium salt, the title compound is obtained.

What is claimed is:

1. A compound of the formula

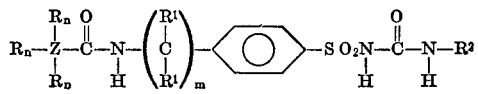

wherein R is lower alkyl, lower alkoxy or halogen; $n$ is 0 or 1; $R^1$ is H or alkyl of from 1 to 3 carbon atoms; $m$ is 1, 2 or 3; Z is a cyclohexadienyl radical or a cyclohexadienyl radical which is mono- di- or tri-substituted by R; and $R^2$ is cycloalkyl or cycloalkene of from 5 to 8 carbon atoms or alkyl-substituted cycloalkyl or cycloalkene wherein the alkyl radical has from 1 to 3 carbon atoms.

2. A compound according to Claim 1 wherein the 2-position of the cyclohexadienyl radical contains a straight chain or branched alkoxy substituent of up to 6 carbon atoms.

3. A compound according to Claim 2 wherein the 4- or 5-position, or both, contains a halogen or a straight chain or branched alkyl substituent of up to 6 carbon atoms.

4. A compound according to Claim 1 wherein $m$ is 2.

5. A compound according to Claim 1 having the name 1-cyclohexyl - 3 - [[p-[2-[(2-methoxy-2,5-cyclohexadien-1-yl)foramido]ethyl]phenyl]sulfonyl]urea.

6. A compound according to Claim 1 having the name 1-cyclohexyl - 3 - [[p-[2-[(5-methyl-2-methoxy-2,5-cyclohexadien - 1 - yl)formamido]ethyl]phenyl]sulfonyl]urea.

7. A compound according to Claim 1 having the name 1-cyclohexyl - 3 - [[p-[2-[(4-methyl-2-methoxy-2,5-cyclohexadien - 1 - yl)formamido]ethyl]phenyl]sulfonyl]urea.

8. A compound according to Claim 1 having the name 1-cyclohexyl - 3 - [[p-[2-[(2,4-dimethyl-2,5-cyclohexadien-1-yl)foramido]ethyl]phenyl]sulfonyl]urea.

9. A compound according to Claim 1 having the name 1-cyclohexyl-3-[[p-[2-[(5-chloro - 2 - methoxy-1,4-cyclohexadien-1-yl)foramido]ethyl]phenyl]sulfonyl]urea.

10. A compound according to Claim 1 having the name 1-cyclohexyl - 3 - [[p-[2-[(5-bromo-2-methoxy-2,5-cyclohexadien-1-yl)formamido]ethyl]phenyl]sulfonyl]urea.

11. A compound according to Claim 1 having the name 1-cyclohexyl - 3 - [[p-[2-[(5-chloro-2-methoxy-2,5-cyclohexadien-1-yl)formamido]ethyl]phenyl]sulfonyl]urea.

12. A compound according to Claim 1 having the name 1-(4-methylcyclohexyl) - 3 - [p-[2-(2,5-dimethyl-2,5-cyclohexadiene - 1 - carboxamido)ethyl]phenyl]sulfonyl urea].

References Cited

UNITED STATES PATENTS 3,406,199  10/1968  Weber et al. _____ 260—553 DA

OTHER REFERENCES

Kurzer: Chem. Rev., vol. 50, p. 27 (1952).

LEON ZITVER, Primary Examiner

G. A. SCHWARTZ, Assistant Examiner

U.S. Cl. X. R.

260—332.2 C, 345.7, 347.2, 465 D, 470, 481 R, 514 J, 556 AR; 424—275, 283, 285, 304, 305, 308, 309, 317, 322